Sept. 18, 1956  J. A. ZUPEZ  2,763,042
APPARATUS FOR APPLYING LINING TO BEARINGS
Filed May 25, 1951  9 Sheets-Sheet 1

Inventor
John A. Zupez
By Wallace and Cannon
Attorneys

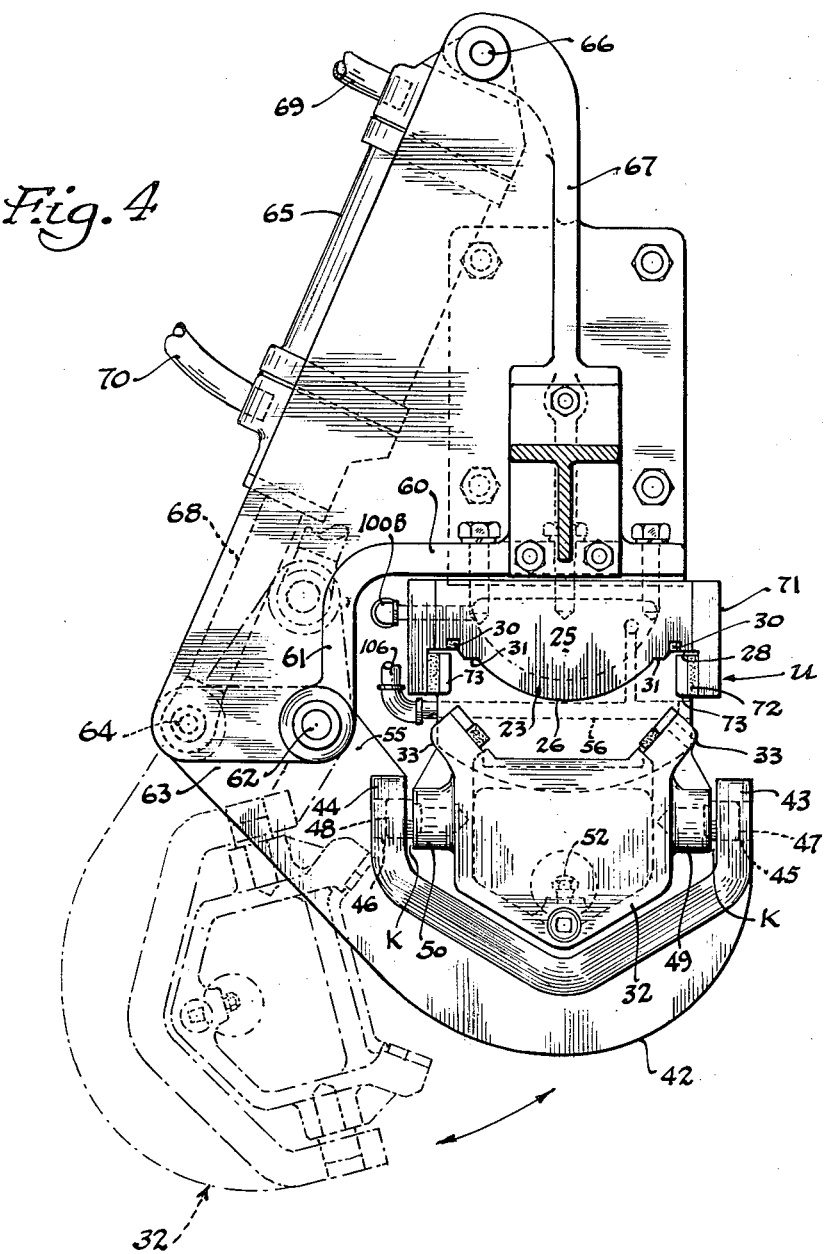

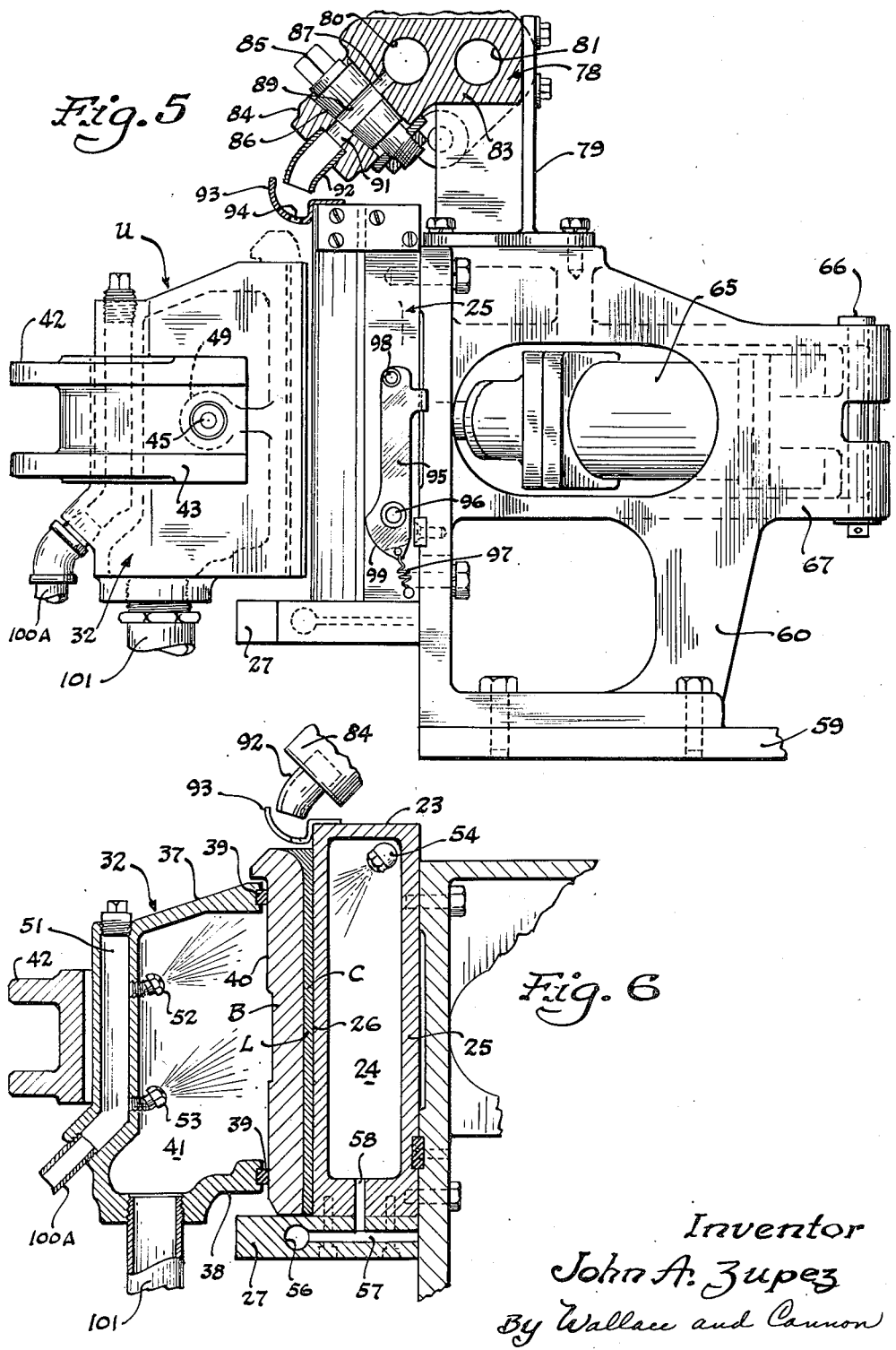

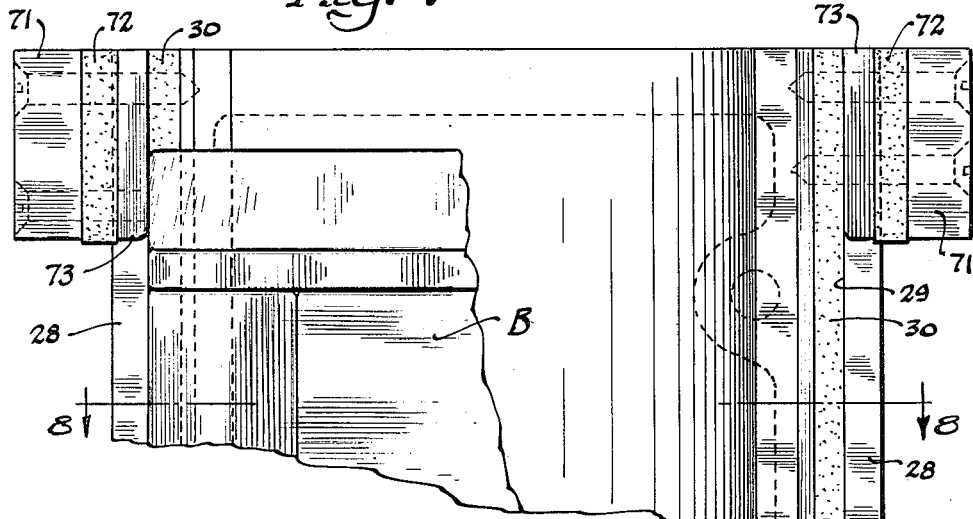
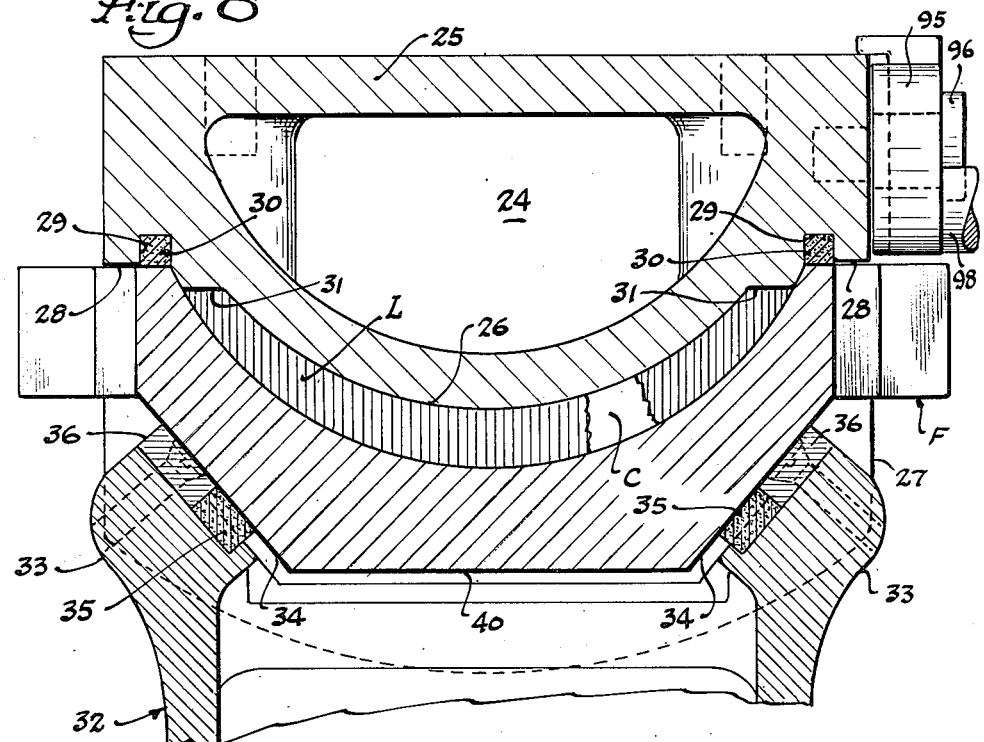

Sept. 18, 1956 J. A. ZUPEZ 2,763,042
APPARATUS FOR APPLYING LINING TO BEARINGS
Filed May 25, 1951 9 Sheets-Sheet 5

Inventor
John A. Zupez
By Wallace and Cannon
Attorneys

Sept. 18, 1956  J. A. ZUPEZ  2,763,042
APPARATUS FOR APPLYING LINING TO BEARINGS
Filed May 25, 1951  9 Sheets-Sheet 7

Inventor
John A. Zupez
By Wallace and Cannon
Attorneys

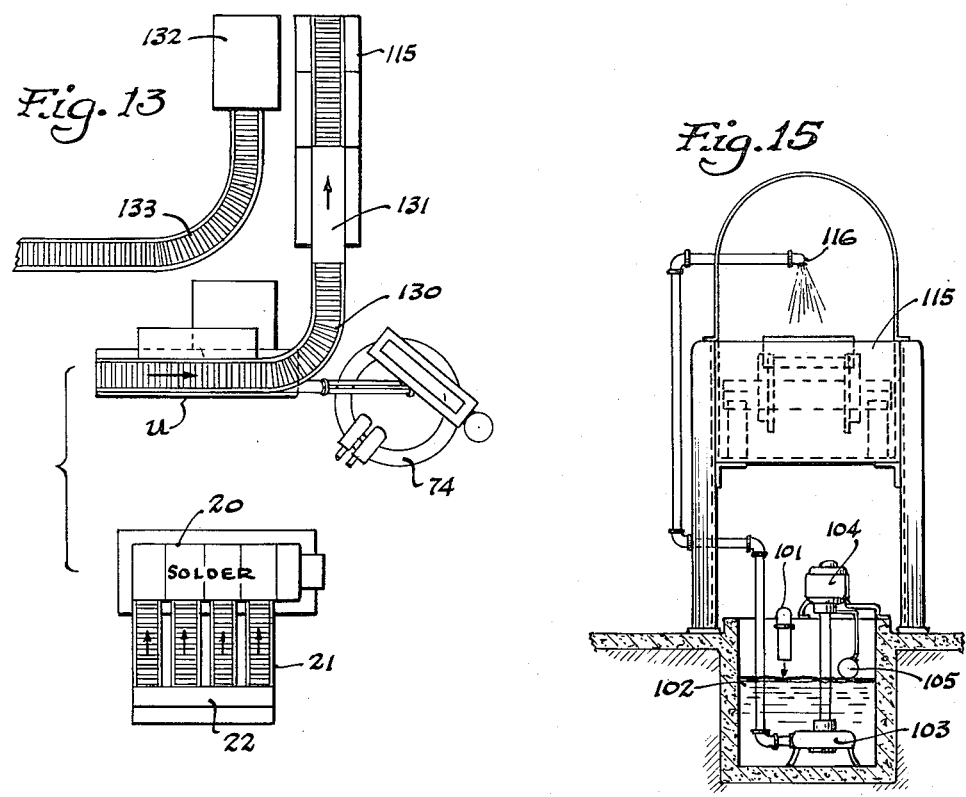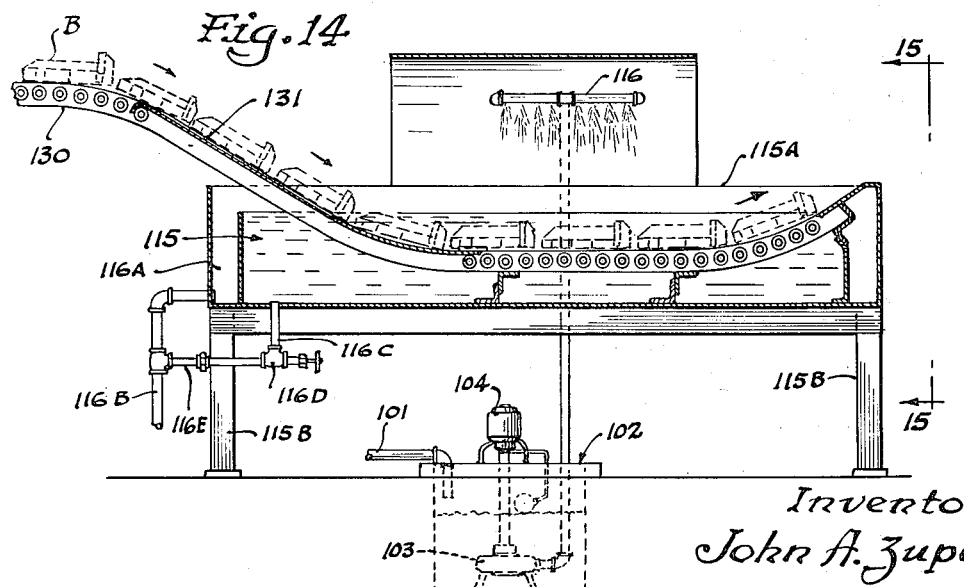

Sept. 18, 1956  J. A. ZUPEZ  2,763,042
APPARATUS FOR APPLYING LINING TO BEARINGS
Filed May 25, 1951  9 Sheets-Sheet 9

Inventor
John A. Zupez
By Wallace and Cannon
Attorneys

United States Patent Office 2,763,042
Patented Sept. 18, 1956

2,763,042

APPARATUS FOR APPLYING LINING TO BEARINGS

John A. Zupez, St. Louis, Mo., assignor to American Brake Shoe Company, New York, N. Y., a corporation of Delaware Application May 25, 1951, Serial No. 228,163

3 Claims. (Cl. 22—123)

This invention relates to the lining of bearings and more particularly to the lining of journal bearings employed on the rolling stock of railroads and the like.

Bearings of the aforesaid character have been lined manually heretofore and it was necessary for each operator to develop a degree of skill in the pouring of the molten lining metal into position on the bearing so as to avoid production of defective bearings. Also in previous operation the bearing was associated with a water cooled arcuate surface so that a cavity to receive the lining was defined between this arcuate surface and the face of the bearing to be lined. In this arrangement, chilling of the lining metal was effected from the surface inwardly toward the bearing and this was not conducive to production of a good bond between the lining metal and the bearing and also it did not afford the desired close grained lining adjacent to the bearing which affords high resistance to the stresses to which the bearing is subjected.

In view of the foregoing, an object of this invention is to afford an apparatus in which a bearing to be lined may be installed and which is of such nature that the pouring of the lining metal onto the bearing may be effected without requiring a high degree of skill on the part of the operator inasmuch as the pouring of the lining metal is effected in such a way that the creation of air bubbles and the like defects in the lining metal is avoided.

Another object of this invention is to chill the molten lining metal applied to a bearing outwardly rather than inwardly so as to thereby afford a firm bond between the lining metal and the bearing and also so as to produce a close grained lining at least adjacent to the bearing.

Yet another object of this invention is to enable bearings of the aforesaid character to be lined more rapidly than has heretofore been possible, and objects ancillary to the foregoing are to provide an apparatus embodying automatically operating elements which function to produce the desired results in the course of a cycle of operation of the apparatus.

Another object of the present invention, specifically, is to enable segmental railway journal bearings to be provided with a bearing lining in an apparatus having parts complemental to certain parts of the bearing so as to assure that the bearing is tightly clamped during the lining operation, and to further assure that the lining is cooled in a highly advantageous manner.

Other and more specific objects of the invention are to tightly clamp a bearing to be lined in association with an arcuate surface so as to thereby afford a cavity into which the lining metal may be poured to be adhered to the bearing; to spray water onto the back of the bearing as soon as the pouring operation is completed; to circulate water through elements of my apparatus so as to maintain the same at a comparatively low temperature, notwithstanding the contact thereof with the molten lining metal; to enable the molten lining metal to be forced through a circuit and past valves which may be operated to effect the pouring operation when desired; to so arrange such a valve that molten metal will not be trapped therein when the valve is closed; to automatically discontinue the spraying and circulating of cooling water and also to automatically unclamp the bearing when the lining operation has been completed; and to provide means effective to break the lined bearing away from the parts with which it is associated during the pouring operation.

Still another important object of this invention is to afford a conveyor onto which bearings lined in my apparatus may be placed to be carried to and through a cooling tank wherein the lined bearings are cooled sufficiently to enable handling thereof so that further operations may be effected promptly on the bearing and without storing the bearings to permit them to cool.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention.

In the drawings:

Fig. 4 is a plan view of the unit shown in Fig. 1, but showing the same in closed position to retain a journal bearing to be lined in position to be lined;

Fig. 5 is a side view of the arrangement shown in Fig. 4, looking in it at right-hand side of Fig. 4;

Fig. 6 is a vertical sectional view taken medially in the unit shown in Fig. 1 and showing the unit in closed position with a journal bearing in position therein, and showing the bearing after the pouring operation has been completed;

Fig. 7 is a fragmentary front elevation of the upper part of the unit shown in Fig. 6 and in which a part of the unit is broken away;

Fig. 8 is a horizontal sectional view taken substantially on the line 8—8 on Fig. 7;

Figure 10:
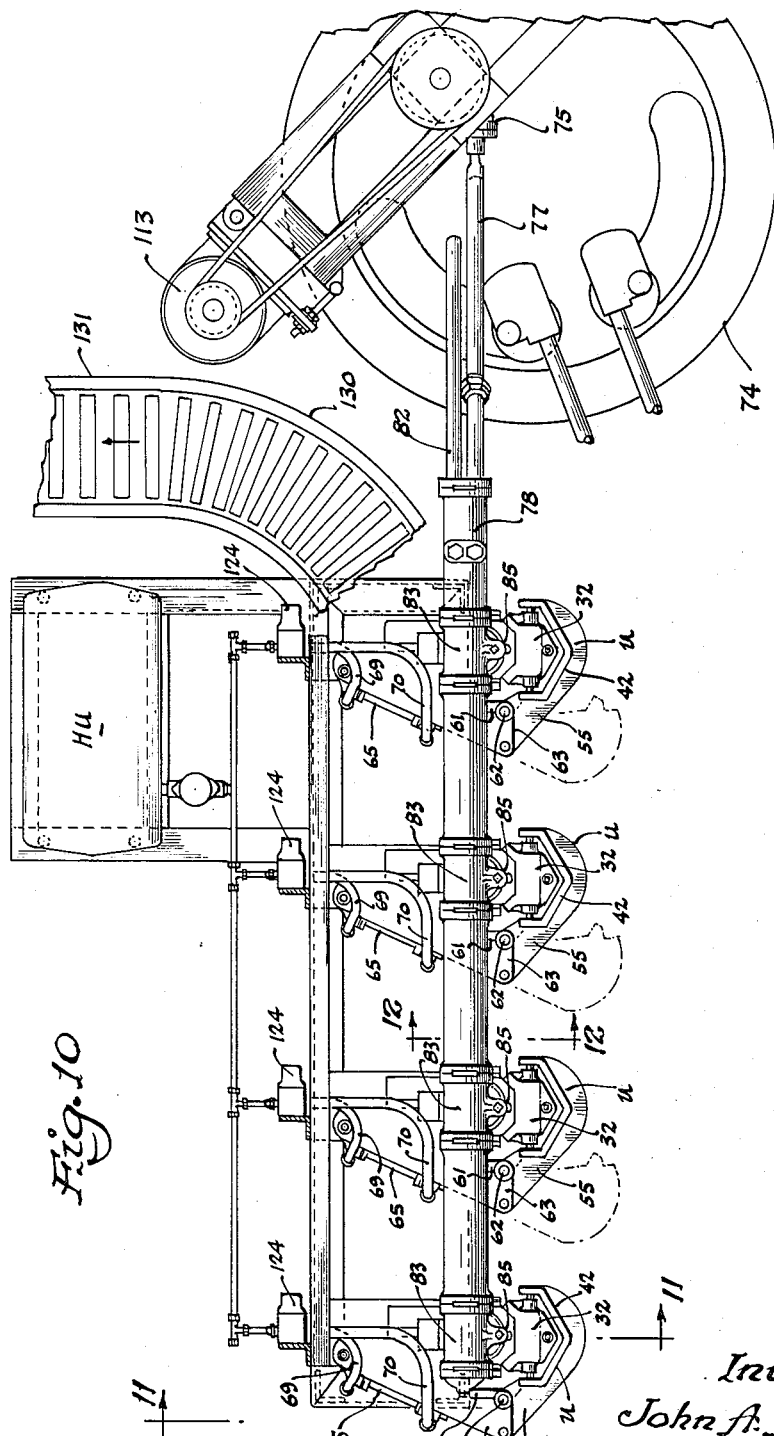
Fig. 10 is a plan view of the apparatus shown in Fig. 9.
Figure 11:
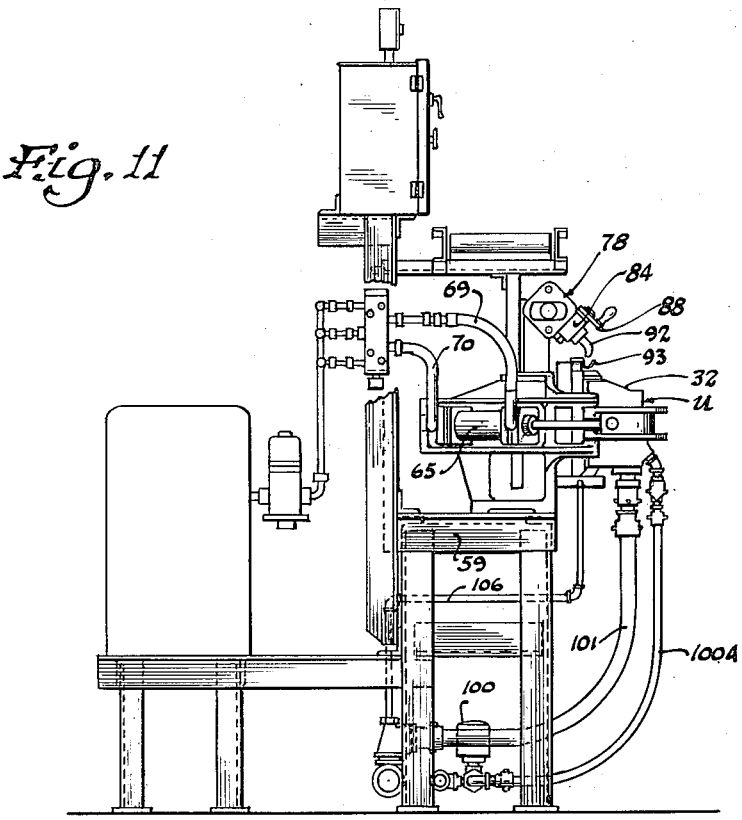
Figure 12A:
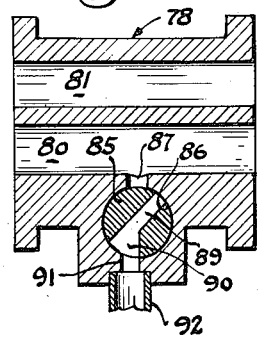
Figure 12:
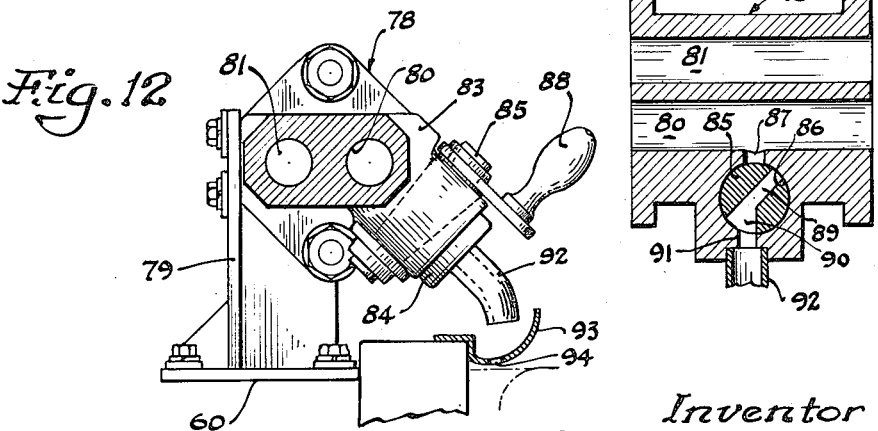
Figure 16:
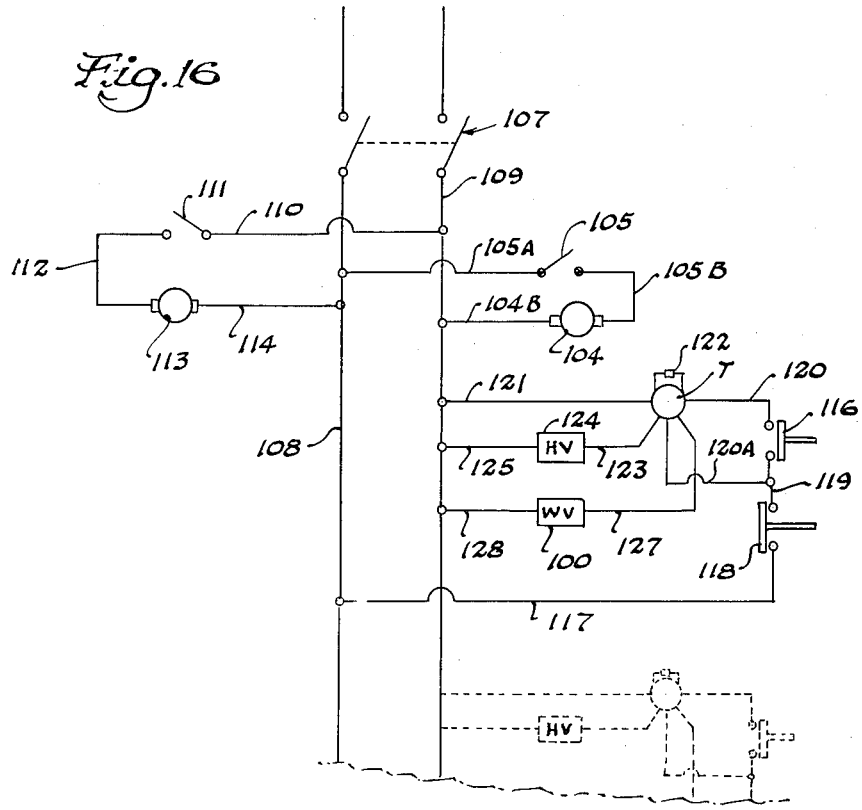
Figure 17:
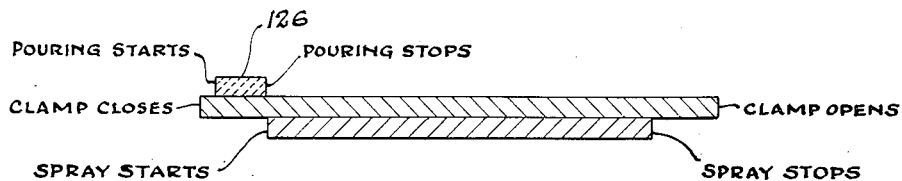

Figs. 11 and 12 are detail views taken substantially and respectively on the lines 11—11 and 12—12 on Fig. 10;

Fig. 12A is a sectional detail view of a portion of the pouring arrangement of my apparatus;

Fig. 13 is a plan lay-out of the arrangement of my novel mechanism and apparatus advantageously used therewith;

Fig. 14 is a longitudinal sectional view through the unit wherein journal bearings lined in my apparatus are cooled to permit normal handling thereof;

Fig. 15 is an end elevational view taken substantially on the line 15—15 on Fig. 14;

Fig. 16 is a diagrammatic view of the electrical connections in my apparatus; and Fig. 17 is a diagrammatic view showing the times of operation of elements of my apparatus.

Figure 2:
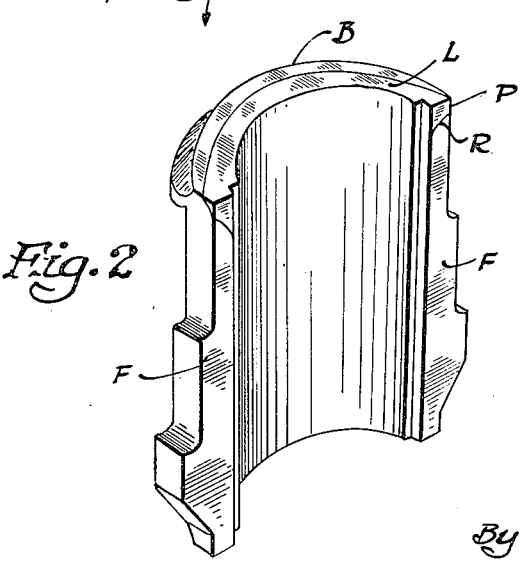
Fig. 2 is a perspective view of a lined journal bearing.
Figure 3:
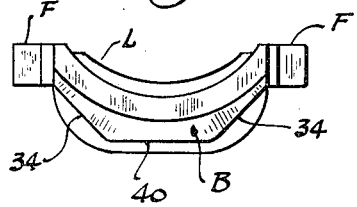
Fig. 3 is a bottom plan view of the bearing shown in Fig. 2.

My novel apparatus is particularly adapted for applying a Babbitt metal lining to a journal bearing of the kind conventionally employed on the rolling stock of railroads and the like. Such a bearing B is shown in Figs. 2 and 3, and by referring thereto it will be seen that the bearing includes a backing member which is commonly referred to as a brass. The outwardly disposed face of the backing of the bearing B is arranged in a conventional manner to cooperate with related elements in the journal box afforded on railway equipment. The inner face of the back of the bearing B is arcuate in configuration, and this face has a lining L of Babbitt metal thereon. The bearing also includes, outwardly of the lined portion thereof, what are herein referred to as marginal faces F which, as best shown in Fig. 3, lie in a common plane. In my apparatus these bottom faces F of the bearing B engage with certain elements of my unit to thereby, in cooperation with the arcuate face of the bearing B, define a cavity C into which molten Babbitt metal may be poured to afford the lining L.

Figure 9:
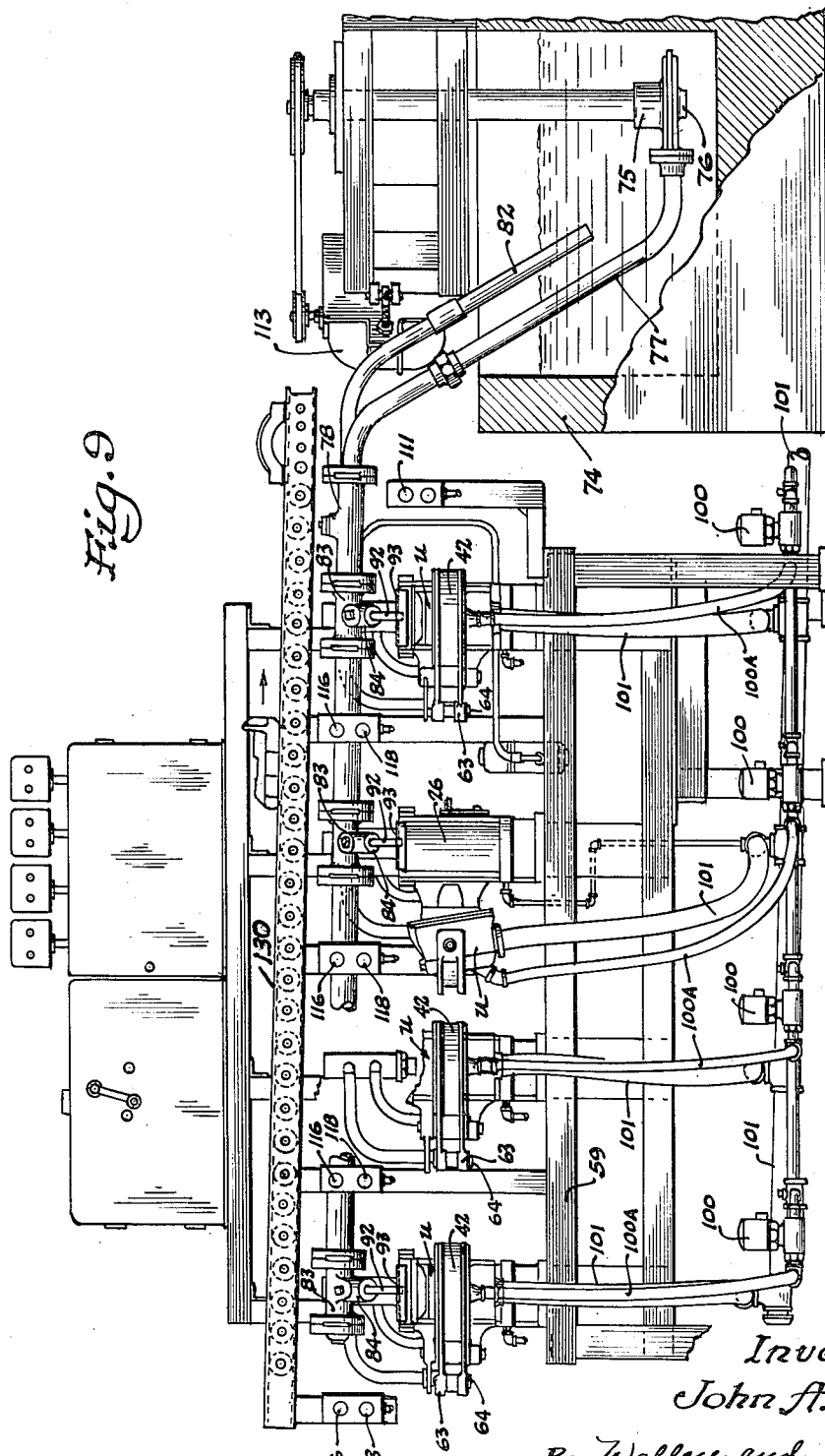
Fig. 9 is a front elevational view of my novel apparatus embodying four of the units of the kind shown, for example, in Fig. 1, and wherein the interconnections established among these units with other elements of my apparatus are illustrated.

In Figs. 9 and 10 I have shown my apparatus as embodying four units U, in each of which the production of a lining L on a bearing B may be effected. The operations will be carried on successively in these units so that by the time the pouring operation in the last of the units has been effected, the Babbitt metal poured in the first pouring operation will have solidified sufficiently to permit the lined bearing to be removed from the unit to be further processed. While I have shown four units in Figs. 9 and 10, it will be understood that a greater or lesser number of these units may be provided as desired or required.

Prior to the time a bearing as B is introduced into one of the units U to have a lining L formed thereon, it is immersed in a tank 20, Fig. 13, which is filled with a solder that may advantageously consist of substantially 70 parts of lead and 30 parts of tin, this solder being maintained in a molten condition. A plurality of conveyors as 21 are provided onto which the bearings to be lined may be placed to be supplied to the tank 20. The surface of the bearing on which the lining L is to be provided will have been suitably finished prior to the time the bearings B are introduced onto a conveyor 21. Also prior to the time the bearings are placed on a conveyor or pallet 21 they are rested face upwardly on the bench 22, and a suitable pickling solution is brushed on the face of the bearing onto which the lining L is to be applied, such solution conveniently being ammonium chloride and zinc chloride solution, this solution also sometimes being referred to as a flux. Each bearing B, with the surface to be lined so treated, is immersed in the molten solder in tank 21 and thereupon the solder adheres to the surface of the bearing on which the flux has been applied so as to thereby afford a soldered face on the portion of the bearing to which the lining L is to be applied, and, as it is understood in the art, this soldered face enables the Babbitt metal of the lining L to be firmly adhered to the bearing B.

As stated, the solder in the tank 20 is maintained in a molten condition so that when bearings as B are introduced thereinto, these bearings are heated to a temperature above that at which the bearings can be handled by the bare hands. Thus, each bearing as B remains in the tank as 20 for a period of time sufficient for the same to be heated to approximately the temperature of the molten solder, and when this temperature is attained, the solder adheres to the pickling face of the bearing. A bearing as B that has been introduced into the tank 20 as just described, is removed therefrom and placed in one of the units U when it is to be lined.

Each unit U comprises a housing 23 which includes an inner chamber 24. The housing 23 also embodies a flat rear wall 25 and an arcuate front wall 26 that is substantially complementary to the arcuate face of the bearing B on which the lining is to be applied. However, the arcuate configuration of the wall 26 is such that it is spaced from the adjacent face of a bearing B, when the same is installed in proper position in the unit U, in a greater amount adjacent to the medial part of the bearing than at the sides thereof, so that the lining L which is produced in the cavity C between the wall 26 and the arcuate face of the bearing B will be thickest in the medial part of the bearing.

Figure 1:
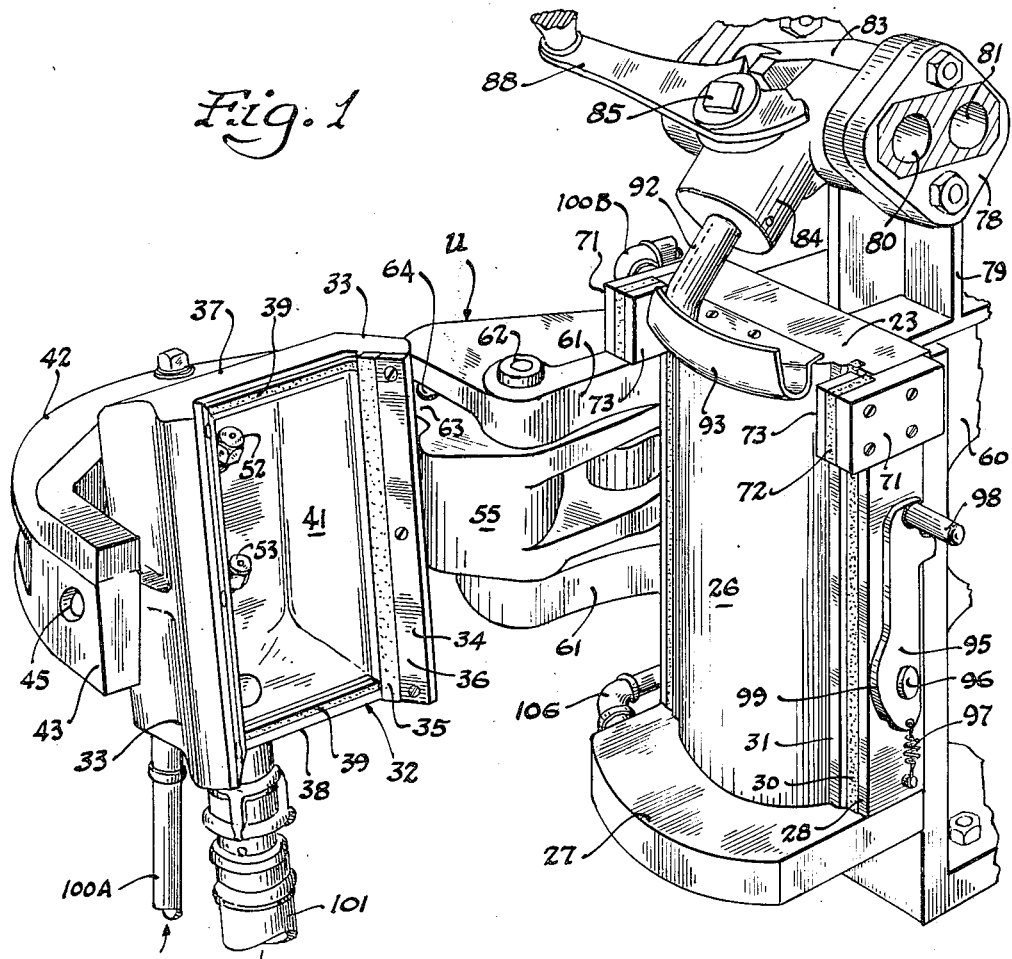
Fig. 1 is a perspective view of a unit employed for lining a journal bearing and showing the same in open position.

A platform 27 is provided at the lower end of the housing 23 and projects forwardly of the wall 26, as best illustrated in Figs. 1 and 6. A bearing as B that is to have a lining as L applied thereto is rested on the upper surface of the platform 27, and at this time the inwardly disposed portions of the marginal faces F are engaged with the parting faces 28, Fig. 8, afforded at opposite sides of the arcuate surface 26. A groove as 29 is formed in each face as 28 and has a packing as 30 of a heat-resisting material provided therein which is effective to seal the faces as F in such a way that Babbitt metal introduced to afford the lining L will not flow onto the faces as F. In this respect it will be noted that the arcuate front face of wall 26 terminates in flat side marginal portions 31, Fig. 8, which are disposed inwardly of the packing 30, and these marginal portions 31 define the ends of the lining L.

The faces F of the bearing B are forced into engagement with the packing 30 and the faces as 28 by a clamping head generally indicated by 32. This clamping head 32 is adapted to cooperate with the rear face of the bearing B to which a lining L is to be applied, and to this end embodies side portions as 33 which include faces disposed in planes parallel with the planes of the faces 34 on the bearing B to be engageable therewith. Resilient compression members as 35 are mounted on the face of each side marginal portion 33 inwardly of the free edge thereof and in position to engage a surface 34 on the bearing B to which a lining L is to be applied. A metallic strip as 36 is secured to each face 33 adjacent to the compression members 35 and limits the degree to which the compression members may be compressed.

The upper and lower walls 37 and 38 of the housing 32 have edge portions extended between the faces of the marginal portions 33, and a gasket as 39 is provided in each of these edge portions in position to engage the rear wall 40 of a bearing B to which a lining L is to be applied. Thus, the gaskets 39 and compression members 33 are effective to seat against the rear faces of the bearing B, and these elements seal a chamber 41, Fig. 9, afforded in the housing 32, the back of a bearing to be lined affording one wall of this chamber.

Each housing as 32 is supported by a bracket 42 which, as best shown in Fig. 4, includes a substantially U-shaped portion having arms 43 and 44 at the free ends thereof that are disposed on opposite sides of the housing 32. The arms 43 and 44, respectively, have openings 45 and 46 formed therein in which pins 47 and 48 are respectively mounted. The inner ends of these pins are fast in bosses 49 and 50 provided on opposite sides of the housing 32 substantially medially in the vertical extent thereof. Therefore, the housing 32 is capable of movement about the horizontal axes of the pins 47 and 48, and by referring to Fig. 4 it will be seen that a clearance K is afforded between the outer faces of the bosses 49 and 50 and the adjacent faces of the arms 43 and 44, so that the housing 32 is capable of shifting laterally relative to the bracket 42. The movement of which the housing 32 is thus capable is effective to insure proper seating of the compression members as 35 and the gaskets as 39 against the surfaces on the rear face of the bearing B with which these elements are adapted to cooperate, and this movement takes care of whatever slight variation there may be among different bearings as B placed in a particular unit as U and insures that the bearing will be properly and tightly clamped in position in the unit.

As has been set forth hereinabove, one of the important objects of the present invention is to insure a firm union of the Babbitt metal lining L with the adjacent face of the bearing B, and this can best be realized by effecting rapid cooling of the Babbitt metal that is adjacent to the face of the bearing B to which it is to be adhered. Hence, each unit as U is arranged to enable a cooling action to be effective on a bearing B immediately after molten Babbitt metal has been poured into the cavity C. Thus, by referring to Fig. 6, it will be seen that a chamber 41 is provided in the housing 32. Nozzles 52 and 53 are mounted in the vertical wall of the chamber 41 to be disposed in the chamber and, as best shown in Fig. 6, these nozzles are inclined upwardly. As will be explained presently, water under pressure is supplied to a passage 51 in the housing 32, and this water is discharged through the nozzles 52 and 53 to be sprayed onto the back of a bearing B clamped in a unit as U to thereby chill the same and consequently effect rapid solidification of the Babbitt metal adjacent to the arcuate face of the bearing B.

It is also advantageous to cool the fixed elements of the unit U that are contacted by the molten Babbitt metal. Consequently a nozzle 54, Fig. 6, is mounted in the upper part of the chamber 24 and water is supplied to this nozzle to be sprayed therefrom onto the wall 26 of the chamber 24. Additionally, a chamber 56, Fig. 6, is provided in the platform 27. This chamber is in communication with a passage 57 which, in turn, through a passage 58, is in communication with the chamber 24, so that water discharged from the nozzle 54 will be effective not only to cool the wall 26 and other parts of the housing 25 but will also be effective to cool the platform 27, and in this way the fixed parts of my unit that are contacted by molten Babbitt metal are maintained at a desired temperature.

The housing 32 and bracket 42 are arranged for pivotal movement about a vertical axis so that the housing 32 may be swung from the closed position thereof shown in full lines in Fig. 4, to the open position thereof shown in broken lines in this view when a bearing B is to be disposed on the platform 27 or to be removed therefrom. By referring to Fig. 9, it will be seen that my apparatus is provided with a table 59 on which the various units U of my apparatus are supported. Thus each unit U includes a bracket 60 which, as best shown in Fig. 5, is suitably secured to the table 59. Each bracket 60 includes forwardly extending spaced apart arms 61, Fig. 1, which afford bearings in which a vertical shaft 62 is mounted and which is held therein against vertical displacement therefrom. The arm 55 of the bracket 42 is mounted between the arms 61 for pivotal movement about the shaft 62. The bracket 42 includes arms 63 which extend away from the shaft 62 to support a vertical shaft 64 which is utilized to impart movement to the housing 32 between the two positions thereof shown in Fig. 4.

In order to impart pivotal movement to the housing 32, a hydraulic cylinder 65, Figs. 4 and 5, is provided which has one end thereof pivotally connected as indicated at 66 to an arm 67 of the bracket 60 which, as best shown in Fig. 4, projects rearwardly from the part of the bracket to which the arms 61 are joined. The usual piston (not shown) in the cylinder 65 is connected to the piston rod 68, Fig. 4, which has the free end thereof pivotally connected to the shaft 64 carried by the arms 63 of the bracket 42. When the housing 32 is in the broken-line position shown in Fig. 4, fluid under pressure is supplied to the tube 69 to be effective on the piston so as to move the piston rod 68 outwardly of the cylinder 65, and this is effective through the arms 63 and the bracket 42 to pivot the housing 32 into the full-line position thereof shown in Fig. 4. When the housing is to be moved from the full-line position shown in Fig. 4 to the broken-line position thereof in this view, fluid under pressure is introduced through the tube 70 so as to thereby move the piston and the piston rod 68 inwardly of the cylinder 65, and this is effective to bring about the desired pivotal movement of the bracket 42 and housing 32.

By referring to Fig. 2, it will be seen that a radius as R is formed at the upper end of the bearing B on each face F thereof. This, as shown in Fig. 2, reduces the surface area of the faces F at the upper end of the bearing and might permit leakage of Babbitt metal were it not for the special means I have provided to prevent this. Thus, by referring to Figs. 1, 4 and 7, it will be seen that plates as 71 are secured to the side walls of the housing 25. These plates extend forwardly of the end portions of the surfaces 28, as best shown in Fig. 4. A pad 72 of resilient heat-resistant material is provided on each of these extended portions. Metallic blocks 73 are secured to the inwardly disposed faces of the pads 72 in any suitable manner and these blocks 73 respectively engage the upper side edges of a bearing B rested on the platform 27 to insure that Babbitt metal will not leak from the position P, Fig. 2, in the pouring operation.

As stated hereinabove, and as shown in Figs. 9 and 10, in the present instance the table 59 supports four units as U, each of which is like the unit described hereinabove. Molten Babbitt metal that is to afford the linings L on bearings B is supplied to the units U so that it may be introduced into the cavity C between the front surface of the wall 26 and the arcuate face of each bearing B mounted in a unit U. In order to afford a supply of molten Babbitt metal, I provide a tank 74, Figs. 9 and 10, which is arranged to be heated in any suitable way so as to maintain the Babbitt metal introduced thereinto in a molten condition. An advantageous Babbitt metal which may be employed in the practice of my invention consists of 88 parts of lead, 8 parts of antimony and 4 parts of tin, but it will be understood that any suitable Babbitt or like metal may be employed.

In order to circulate the molten Babbitt metal from the tank 74 and through my apparatus, I immerse a centrifugal pump 75 in the molten Babbitt metal in the tank 74. This pump includes an inlet as 76 through which Babbitt metal is withdrawn from the tank 74 to be forced by the pump through the pipe 77 to a conduit generally indicated by 78. By referring to Fig. 5, it will be seen that a bracket 79 is secured to the upper side of the bracket 60 of the illustrated unit U, and this bracket supports the conduit 78, a similar arrangement being afforded in each unit U. The conduit 78 includes two passageways respectively indicated by 80 and 81 and the pipe 77 is connected to and discharges into the passage 80. The passages 80 and 81 are interconnected one with the other at the left-hand end of the conduit 78, as it is viewed in Fig. 9, so that molten Babbitt metal flowing from the pipe 77 may flow through the passage 80 and be returned through the passage 81 to the outlet end thereof whereat a pipe 82, Figs. 9 and 10, is connected which, as best shown in Fig. 9, leads into the tank 74 to be effective to return Babbitt metal to this tank. The pump 75 is maintained in operation constantly so that there is a constant flow of Babbitt metal through the pipe 77, the passages 80 and 81 and the pipe 82.

When the apparatus is initially to be set in operation the pump 75 is operated so as to impart a relatively high velocity to the Babbitt metal discharged from the pump into the pipe 77. The Babbitt metal at this relatively high velocity is circulated through the pipe 77, passages 80 and 81, and pipe 82 until these parts are heated to a temperature substantially equivalent to the temperature of the molten Babbitt metal. When this condition has been attained the speed of operation of the pump is reduced so that the Babbitt metal flows through the pipe 77, passages 80 and 81, and pipe 82, at a velocity sufficient to insure against solidification of the Babbitt metal in these pipes and passages.

Adjacent to each unit U the conduit 78 is provided with a header 83. Each header 83 is equipped with a downwardly inclined boss 84, Fig. 1, which houses a valve mechanism including the valve stem 85 which, as best shown in Fig. 5, is mounted for rotative movement in an opening in the boss 84. A port 87 leads from the passage 80 to one wall of the opening 86 and a supply of molten Babbitt metal is maintained in this port. A handle 88 is detachably connected to the formed portion at the upper end of the valve stem 85 so as to permit the same to be rotated in the opening 86. As best shown in Fig. 12A, valve stem 85 has a port 89 formed therein which, at its discharge end, is flared outwardly as indicated at 90. By manipulation of the handle 88 the valve stem 85 may be rotated in the opening 86 to bring port 89 into communication with the port 87 and also with the port 91 formed in the boss 84 and thereupon molten Babbitt metal from the passage 80 flows to the discharge spout 92 connected to the boss 84 and in communication with the port 91. When the operator of my apparatus has manipulated the handle 88 to cause molten Babbitt metal to flow from the passage 80 to the discharge spout 92, such operator observes the introduction of molten Babbitt metal into the cavity C so that when the Babbitt metal in such cavity becomes visible near the top thereof, the handle 88 may be manipulated to move the port 89 out of registry with the port 87. At this time, however, the flared portion 90 of the port 89 remains in communication with the port 91 so that any Babbitt metal remaining in the port 89 will be discharged therefrom and in this way solidfication of the Babbitt metal in the valve mechanism is avoided.

By referring to Figs. 5 and 12 it will be seen that a trough-like basin 93 is mounted on the wall 26 adjacent to the upper end thereof and this basin is desirably congruent to the arcuate front face of the wall 26. A plurality of discharge openings or ports 94, Fig. 5, are formed in the lower part of the basin 93 and lead to the cavity C. Molten metal discharged from the nozzle 92 flows into the basin or trough 93 and then through the ports 94 into the cavity C. The provision of the basin 93 and the ports 94 insure a uniform non-turbulent distribution of the molten Babbitt metal in the cavity C so as to thereby avoid the production of air pockets and other defects in the lining L.

After a pouring operation has been completed and the housing 32 has been swung into the broken-line position thereof shown in Fig. 4, the bearing B with a lining L thereon is ready to be discharged from the unit U. In order to facilitate separation of the bearing from the front surface of wall 26 I have provided a kickout device consisting of a lever 95, Figs. 1, 5 and 8, pivotally mounted on a pin 96 mounted in a side wall of a housing 23. A spring 97 is effective on the lever 95 to hold the same in a normal-at-rest position, such as that illustrated in Fig. 5. The lever 95 is equipped with a handle 98 which may be employed to move the lever 95 clockwise, as viewed in Fig. 1, and when the lever is so moved, the cam surface 99 thereon engages the adjacent face F of the lined bearing B and this is effective to break the lining L away from the front surface of wall 26 and other fixed elements of the unit so as to thereby facilitate removal of the lined bearing from the unit.

Water is supplied to the nozzles 52, 53 and 54 from any suitable source of water under pressure. The flow of water to such nozzles is controlled by a water valve 100, Fig. 9, for each unit. As will be explained presently, when the pouring of a lining L is completed, circuit is closed to the operating solenoid of the particular water valve 100 at a predetermined time and thereupon the valve opens and water is supplied to the nozzles 52 and 53 through flexible pipe 100A which leads to the passage 51 with which the nozzles 52 and 53 are in communication. The water discharged from the nozzles 52 and 53 is sprayed onto the back of the bearing B and is effective to chill the Babbitt metal so as to insure a good bonding thereof to the bearing. A pipe 100B, Fig. 1, is connected to pipe 100A and leads to the nozzle 54. Water discharged from the nozzle 54 is effective to cool the housing 23 and the platform 27 so as to prevent buildup of heat in these elements as a result of successive pouring operations.

Water flowing from the back of the bearing B is discharged through a pipe 101 which is directed to a sump 102, Figs. 14 and 15, that is located below a cooling tank 115 to be described presently. Water discharged from the nozzle 54 flows through the chamber 24 to the chamber 58 and thence through a pipe 106, Figs. 1 and 11, that is connected to the drain line 101.

When a lined bearing B is removed from one of the units U, it is placed upon the inclined conveyor 130 that is disposed above the units U and which is effective to carry the lined bearings B to a conveyor 131, the bearings passing around a right angular bend in the conveyor 130 that is shown in Fig. 10. The conveyor 131 extends into a cooling tank 115 that is mounted in a housing 115A supported by a stand 115B.

Cooling water for the tank 115 is supplied from the sump 102. To this end a pump 103 is mounted in the sump and is driven by a motor 104. Operation of the motor 104 is under control of a float switch 105 which, when closed, establishes a circuit through conductor 105A, Fig. 16, from conductor 108 through switch 105 and conductor 105B to the motor 104 and then through conductor 104B to the conductor 109. When the water level in the sump attains a predetermined height, the switch 105 closes circuit to the motor 104 and thereupon the pump 103 forces water withdrawn from the sump through the pipe 103A to the spray head 116, Figs. 14 and 15, mounted above the tank 115. Water discharged from the spray head 116 collects in the tank 115 and as the bearings B on the conveyor 131 move into the cooling water in the tank 115, they are cooled so that they may be removed from the discharge end of the conveyor 131 to be placed on the platform of the trimmer 132, Fig. 13, which is effective to remove flashings and the like from the lined bearings. From the trimmer 132 the bearings are passed onto a conveyor 133 which carries the bearings away to subsequent operations that are to be performed thereon.

When a supply of molten Babbitt metal is afforded in the tank 74, my apparatus may be set in operation. To this end the main switch 107, Fig. 16, is closed to thereby supply electric current to the conductors 108 and 109. A motor 113, Figs. 9, 10 and 16, is provided for operating the pump 75. Hence, when my apparatus is to be set in operation, circuit is closed to the motor 113 which then operates the pump 75 to cause the molten Babbitt metal to flow through pipe 77, passages 80 and 81 and back through pipe 83 to the tank 74. When the motor 113 is initially set in operation the connection therewith to the pump 75 is such that the pump is operated at a relatively high rate of speed so as to thereby rapidly circulate the molten Babbitt metal through pipe 77, passages 80 and 81 and pipe 83, and this rapid flow of molten Babbitt metal is continued until these parts through which the Babbitt metal is to flow have attained the temperature at least approximating that of the molten Babbitt metal. When this condition is attained then the connection of the motor 113 to the pump 75 is arranged to operate the pump at a normal rate of speed. By referring to Fig. 16, it will be seen that when the motor 113 is set in operation, the switch 111, Figs. 9 and 16, is closed and thereupon circuit is established from conductor 109 through conductor 110, closed switch 111, conductor 112, motor 113 and conductor 114 to the conductor 108.

Each unit U, as explained hereinabove, includes a water valve 100 that controls the flow of water to the nozzles 52, 53 and 54. Each unit U also includes a hydraulic valve 124, Figs. 10 and 16, which is effective to control the flow of liquid under pressure from the hydraulic unit HU to the tubes 69 and 70 which lead to the hydraulic cylinder 65 of the particular unit. Each unit U also includes a timer T which is effective to control a cycle of operation of each unit U. Each unit also includes a start button 116 and a stop button 118, Figs. 9 and 16.

When my apparatus is to be set in operation a bearing B is removed from the tank 20 and is placed on the platform 27 of the first unit U which is the one located at the right-hand end of the apparatus as it is viewed in Fig. 9. At this time a supply of molten Babbitt metal will be flowing to the headers as 83 associated with the respective units U. After a bearing B has been placed on the platform 27 in the manner described hereinabove with the concave face thereof spaced from the forward face of the wall 26 so as to afford the cavity C into which the molten Babbitt metal is to be introduced, the start switch 116 of the first unit U is pressed and thereupon circuit is established from conductor 108, Fig. 16, through conductor 117, closed switch 118, conductor 119, closed switch 116, conductor 120, timer T and conductor 121 to conductor 109. A holding circuit 122 is provided for each timer T and is closed when circuit as aforesaid is established to the particular timer T. The holding circuit is established through the timer T between conductors 120A and 121 and is effective to maintain the timer T operative for the cycle of operation of the particular unit U. The holding circuit permits release of the switch 116 after it has been closed for a time sufficient to establish this circuit.

The timer T includes a switch which establishes circuit from the conductor 120A to the conductor 123 that leads to one end of the winding of the operating solenoid for the hydraulic valve 124, the other end of this winding being connected to conductor 109 by a conductor 125. Thus, closure of switch 116 to establish circuit to the timer T is effective to establish circuit to the solenoid of the hydraulic valve 124 which thereupon operates to supply liquid under pressure from the hydraulic unit HU through the tube 69 to the hydraulic cylinder 65 of the particular unit, and this results in moving the clamping housing 32 from the broken line position thereof shown in Fig. 4, into the closed clamping position thereof shown in full lines thereof in this view.

By referring to Fig. 17 it will be seen that immediately after the clamping housing 32 attains its clamping position the pouring operation is initiated. Thus, the operator manipulates the handle 88 of the first unit to cause Babbitt metal to flow in the manner explained hereinabove to the distributing trough 93, from whence it flows into the cavity C. As the level of the molten Babbitt metal of the cavity C rises to the desired height, this is noted by the operator who then manipulates the handle 88 to close off flow of Babbitt metal to the trough 93. The length of the pouring operation with respect to the other operations of a unit as U is indicated at 126, Fig. 17.

The timer T is so arranged that, after an elapse of time sufficient to enable a pouring operation to be completed, a switch in the timer closes circuit from the conductor 120A to a conductor 127 which leads to one end of the winding of the operating solenoid for the water valve 100, the other end of this winding being connected by a conductor 128 to the conductor 109. This is effective to open the water valve 100 whereupon water is supplied to the nozzles 52, 53 and 54 for the purpose and in the manner explained hereinabove. The circuit to the solenoid of the water valve 100 is maintained closed to keep this valve open until shortly before the clamping housing 32 is to be moved from its closed to its open position, the particular time relation between these two operations being illustrated in Fig. 17. Shortly after circuit to the winding of the solenoid for the valve 100 has been opened the switch in the timer T again closes circuit from the conductor 120A to the conductor 123 whereupon circuit is again closed to the operating solenoid of the hydraulic valve 124, which thereupon functions to shut off the supply of liquid under pressure from the unit HU through the tube 69 and opens circuit from the unit HU to the tube 70. The liquid supplied through the tube 70 to the hydraulic cylinder 65 is effective, in the manner hereinabove explained, to move the housing 32 into the open position thereof shown in broken lines in Fig. 4.

It will be understood that switches as 116 and 118, a timer as T, a hydraulic valve as 124 and a water valve as 100 are afforded for each of the units U. Therefore, after the operator has completed a pouring operation at the first unit U, he withdraws another bearing from the tank 20 and places this upon platform 27 of the second unit U. He then closes the switch 116 for this unit whereupon the cycle of operation described hereinabove with reference to the first unit U may proceed. After the pouring operation of the second unit has been completed the operator withdraws a third bearing from the tank 20 and places this on the platform 27 for the third unit thereafter the cycle of operation described hereinabove with reference to the first unit U proceeds for the third unit. Then the operator withdraws a fourth bearing from the tank 20 and places this on the platform 27 for the fourth unit U and thereupon a cycle of operation of this unit, like that described hereinabove with reference to the first unit, proceeds. By the time the pouring operation for the fourth unit is completed the valve 124 for the first unit will have operated to admit fluid through the pipe 70 so that the housing 32 for the first unit will be moved into the broken-line position thereof shown in Fig. 4. Consequently when the pouring operation for the fourth unit has been completed the operator returns to the first unit U and grasps the handle 98 on this unit and moves the same in a clockwise direction, as viewed in Fig. 1, and thereupon the lined bearing in the first unit is broken away from the wall 26 and associated elements of this unit. Then the operator picks up this lined bearing B and places it on the conveyor 130, Figs. 9 and 10, which conveys the bearing to the cooling tank 115. Another bearing is then withdrawn from the tank 20 and placed in the first unit U and thereafter operation proceeds as above described.

As explained hereinabove, cooling water in the tank 115 is replenished from time to time upon operation of the pump 103. When the tank 115 is filled and additional cooling water is supplied thereto, this flows over into the channel 116A defined between the housing 115A and the tank. Water passing to this channel is drained off through the drain 116B. At the end of an operation it may be advantageous to drain the tank 115 and to this end the drain pipe 116C leads from the tank 115 to a valve 116D which, through a pipe 116E, is connected to the drain 116B. By opening the valve 116D the tank 115 may be drained.

Hereinabove I have described the pouring operations and the breaking-away operations as being effected manually, but it will be understood that if desired, resort could be had to automatic means for performing these functions. It will also be manifest from the foregoing description that I have provided an apparatus wherein the lining of bearings with Babbitt metal or similar material may be effected in a continuous operation. Moreover, by reason of the fact that cooling water is sprayed onto the back of the bearing to cool the same when molten Babbitt metal is brought into association therewith, I am enabled to chill the molten Babbitt metal that is to afford the lining outwardly away from the bearing and in this way I assure good adherence of the lining to the bearing, and I also produce a close grained structure in the lining, particularly in the portions thereof adjacent to the bearing.

Hence, it will be manifest that my novel arrangement as described herein enables the hereinabove set forth and kindred objects of this invention to be realized, and while I have illustrated and described a preferred embodiment of my invention, it is to be understood that this is capable of variation and modification.

I claim:
1. In a unit wherein a lining may be applied to the arcuate face of a segmental railway journal bearing, a housing providing a vertical wall embodying an arcuate vertical face complemental to the face of the bearing and a cooling chamber behind said wall, a support projected outwardly of said arcuate vertical face at the lower end thereof and on which one end of such a bearing to be lined may be disposed with the arcuate face thereof directed toward the arcuate face of said wall, sealing means on said vertical wall disposed along opposite side edges of the arcuate face thereof and with which there may be engaged marginal faces disposed outwardly of the arcuate face of such a bearing having one end rested on said support to dispose the arcuate face of the bearing in spaced relation with the arcuate face of the vertical wall and thereby define a cavity sealed at the bottom and at either side into which molten lining metal may be introduced to afford a lining on the bearing, an open faced housing pivotally arranged at the side of the first-named housing and having a rear wall and spaced apart side and upper and lower walls extended forwardly therefrom for engaging the back of said bearing along a continuous margin thereabout and for holding said marginal faces on the bearing forcefully in engagement with said sealing means to thereby seal opposite edges of said cavity and prevent escape of molten metal along such edges, means for closing forcefully the second-named housing on the back of said bearing disposed on said support as aforesaid to provide a cooling chamber at the back of the bearing closed off by the back of the bearing and the walls of the second-named housing, means in the second-named chamber including a discharge nozzle for directing a coolant spray confined within the second-named chamber against the back of a bearing operatively disposed on said support, and means in the first-named chamber including a discharge nozzle for supplying a coolant to the rear of said vertical wall.

2. In a unit wherein a lining may be applied to the arcuate face of a segmental railway journal bearing, a housing providing a vertical wall embodying an arcuate vertical face complemental to the face of the bearing and a cooling chamber behind said wall, a horizontal support projected outwardly of said arcuate vertical face at the lower end thereof and on which such a bearing to be lined may be disposed with the arcuate face thereof directed toward the arcuate face of the wall, a passage extended from said cooling chamber to and through said support whereby a coolant supplied to said chamber may also be supplied to said support, sealing means on said vertical wall disposed along opposite side edges of the arcuate face thereof and with which there may be engaged marginal faces disposed outwardly of the arcuate face of a bearing rested on said support to dispose the arcuate face of the bearing in spaced relation with the arcuate face of the vertical wall and thereby define a cavity sealed at the bottom and at either side into which molten lining metal may be introduced to afford a lining on the bearing, an open faced housing having a rear wall and spaced apart upper and lower walls and side walls projecting forwardly therefrom adapted forcefully to engage a continuous margin about the back of said bearing including portions immediately opposite said marginal faces thereof to hold the bearing forcefully in engagement with said sealing means and thereby seal opposite edges of the cavity and prevent escape of molten metal along such edges, means supporting the second-named housing for movement toward and away from the back of a bearing rested on said support to afford a second chamber at the back of said bearing closed off by the walls of the second-named housing and by the back of said bearing, at least a nozzle in the second-named chamber for supplying coolant in the form of a spray confined within the second-named chamber to the back of bearing rested on said support, and at least a nozzle in the first-named cooling chamber for supplying a coolant to the back of said vertical wall and to said support to cool the fixed portions of said unit that come in contact with the bearing lining.

3. In a unit wherein a lining may be applied to the arcuate face of a segmental railway journal bearing, a housing providing a vertical wall embodying an arcuate vertical face complemental to the face of the bearing and a cooling chamber behind said vertical wall, a support projected outwardly of said arcuate vertical face at the lower end thereof and on which one end of such a bearing to be lined may be disposed with the arcuate face thereof directed toward the arcuate face of the wall, discharge means in said cooling chamber for supplying cooling fluid as a spray to the back of said vertical wall, a passage leading from said cooling chamber to and through said support whereby coolant may be directed from said cooling chamber to the support, sealing means on said vertical wall disposed along opposite edges of the arcuate face thereof and with which there may be engaged marginal faces disposed outwardly of the arcuate face of a bearing rested on said support to dispose the arcuate face of the bearing in spaced relation with the arcuate face of the vertical wall and thereby define a cavity closed at the bottom and at either side into which molten lining metal may be introduced to afford a lining on the bearing, another housing having an open faced cooling chamber enclosed by a rear wall and spaced apart side and upper and lower walls adapted to engage along a continuous margin about the back of said bearing including portions immediately opposite said marginal faces on the bearing to hold said bearing in engagement with said sealing means and thereby seal opposite edges of the cavity against escape of molten metal along such edges, a discharge spout disposed above the arcuate face of said wall emptying into said cavity for supplying molten lining metal thereto, means supporting the second-named housing for movement toward and away from said bearing rested on said support to afford a cooling chamber at the back of said bearing closed off at the front by the side and upper and lower walls of the second-named housing engaging along said continuous margin at the back of said bearing, and at least a jet in the second-named chamber for directing cooling water as a spray against the back of said bearing whereby said lining may be cooled from the back of the bearing.

References Cited in the file of this patent

UNITED STATES PATENTS

| | | |
|---|---|---|
| 729,755 | Gates | June 2, 1903 |
| 1,220,211 | Feldkamp et al. | Mar. 27, 1917 |
| 1,618,430 | Hempy | Feb. 22, 1927 |
| 1,854,718 | Rawson | Apr. 19, 1932 |
| 2,297,491 | Meier | Sept. 29, 1942 |
| 2,364,615 | Beckes | Dec. 12, 1944 |
| 2,437,107 | Lyons | Mar. 2, 1948 |
| 2,459,892 | Palmer et al. | Jan. 25, 1949 |
| 2,473,482 | Tobener | June 14, 1949 |
| 2,473,483 | Tobener et al. | June 14, 1949 |
| 2,493,414 | Morrison | Jan. 3, 1950 |
| 2,526,753 | Huck | Oct. 24, 1950 |
| 2,530,853 | Brennan | Nov. 21, 1950 |
| 2,555,998 | Rankin et al. | June 5, 1951 |
| 2,568,525 | Waddington | Sept. 18, 1951 |

FOREIGN PATENTS

| | | |
|---|---|---|
| 521,657 | Germany | Mar. 25, 1931 |